(12) United States Patent
Campbell et al.

(10) Patent No.: US 11,101,884 B1
(45) Date of Patent: Aug. 24, 2021

(54) LOCALIZING ANOMALIES OF A FIBER OPTIC NETWORK WITHIN THE CONTEXT OF A GEOGRAPHIC MAP

(71) Applicant: Ciena Corporation, Hanover, MD (US)

(72) Inventors: Christiane Louise Campbell, Ottawa (CA); Tommaso D'Ippolito, Ottawa (CA); Blair Moxon, Ottawa (CA); Gerard L. Swinkels, Ottawa (CA); Anthony Parravano, Ottawa (CA)

(73) Assignee: Ciena Corporation, Hanover, MD (US)

( * ) Notice: Subject to any disclaimer, the term of this patent is extended or adjusted under 35 U.S.C. 154(b) by 11 days.

(21) Appl. No.: 16/827,907

(22) Filed: Mar. 24, 2020

(51) Int. Cl.
*H04B 10/071* (2013.01)
*H04Q 11/00* (2006.01)
*H04J 14/02* (2006.01)

(52) U.S. Cl.
CPC ........ *H04B 10/071* (2013.01); *H04J 14/0212* (2013.01); *H04Q 11/0066* (2013.01); *H04Q 2011/0086* (2013.01)

(58) Field of Classification Search
CPC ............... H04B 10/071; H04J 14/0212; H04Q 11/0066; H04Q 2011/0086
USPC .......................................................... 398/21
See application file for complete search history.

(56) References Cited

U.S. PATENT DOCUMENTS

| | | |
|---|---|---|
| 6,112,015 A | 8/2000 | Planas et al. |
| 6,414,595 B1 | 7/2002 | Scrandis et al. |
| 6,516,348 B1 | 2/2003 | MacFarlane et al. |
| 7,149,975 B1 | 12/2006 | Johnson et al. |
| 7,522,846 B1 | 4/2009 | Lewis et al. |
| 8,015,289 B2 | 9/2011 | Hill et al. |
| 8,867,371 B2 * | 10/2014 | Bowler ............... H04L 41/0677 370/242 |
| 9,392,462 B2 | 7/2016 | Raleigh et al. |
| 9,851,726 B2 | 12/2017 | Ibrahim et al. |
| 2003/0212588 A1 | 11/2003 | Brown |
| 2003/0216971 A1 | 11/2003 | Sick et al. |
| 2004/0015309 A1 * | 1/2004 | Swisher .................. H04L 41/22 702/79 |
| 2005/0198247 A1 | 9/2005 | Perry et al. |
| 2007/0132733 A1 | 6/2007 | Ram |
| 2011/0055390 A1 | 3/2011 | Malloy et al. |
| 2013/0290791 A1 * | 10/2013 | Basile ..................... H04L 41/22 714/47.1 |
| 2014/0133844 A1 * | 5/2014 | Dahlfort ............ H04B 10/0771 398/10 |
| 2014/0133845 A1 * | 5/2014 | Dahlfort ............ H04B 10/0791 398/12 |

(Continued)

*Primary Examiner* — Dalzid E Singh
(74) *Attorney, Agent, or Firm* — Clements Bernard Walker; Lawrence A. Baratta, Jr.; Christopher L. Bernard

(57) ABSTRACT

Systems and methods for displaying a localization of one or more anomalies in a fiber optic network are provided. In one implementation, a system includes a processing device and a memory device. The memory device is configured to store an anomaly localization module having logic instructions, which, when executed, cause the processing device to display, on a Graphical User Interface (GUI), Network Elements (NEs) and physical fiber plant links of a fiber optic network on a generalized geographical map. Responsive to a user selection, the logic instructions are further configured to cause the processing device to display, on the GUI, a physical fiber plant map based on obtained geographical coordinates of components associated with the fiber optic network.

20 Claims, 8 Drawing Sheets

(56) References Cited

U.S. PATENT DOCUMENTS

| | | |
|---|---|---|
| 2014/0169791 A1 | 6/2014 | Swinkels et al. |
| 2014/0198311 A1* | 7/2014 | L'Heureux ........ G01M 11/3118 356/73.1 |
| 2014/0254392 A1 | 9/2014 | Wolcott et al. |
| 2015/0229528 A1 | 8/2015 | Swinkels et al. |
| 2015/0333824 A1 | 11/2015 | Swinkels et al. |
| 2016/0050470 A1 | 2/2016 | Swinkels et al. |
| 2016/0119806 A1 | 4/2016 | Carbajal |
| 2016/0182147 A1* | 6/2016 | Liu ........................ H04L 45/64 398/4 |
| 2018/0006715 A1* | 1/2018 | Tyagi ................. H04B 10/0791 |
| 2018/0314616 A1 | 11/2018 | Savolainen |

* cited by examiner

US 11,101,884 B1

LOCALIZING ANOMALIES OF A FIBER OPTIC NETWORK WITHIN THE CONTEXT OF A GEOGRAPHIC MAP

TECHNICAL FIELD

The present disclosure generally relates to optical networking systems and methods. More particularly, the present disclosure relates to obtaining data related to geographical coordinates of a fiber optic network infrastructure and data related to testing the fiber optic network and then integrating this data into a Network Management System (NMS) in order to localize anomalies of the fiber optic network within the context of a real-world geographic map.

BACKGROUND

Generally, a Network Management System (NMS) enables a network operator to manage and control various aspects of a communication network, such as a fiber optic network. In some cases, an NMS may display measurement processes to measure and test the fiber optic network to check that the network is operating properly. Test results may reveal that certain types of issues may exist in the network, which may require re-routing traffic, performing maintenance, or conducting other troubleshooting steps.

Although many conventional NMS software applications may be able to detect when an anomaly is present within the fiber optic network, the conventional systems normally are unable to accurately pinpoint the location of anomalies, particularly if the anomalies are detected along lengthy routes spanning distant cities. Usually, indications of anomalies are provided to the network operator in a generalized, simplified manner and do not attempt to provide more specific geographical information. Instead, a network operator may need to perform further investigation and research to better pinpoint where the anomalies may exist. For example, the further investigation and research may involve sending out field engineers/technicians with testing equipment (e.g., Optical Time-Division Reflectometry (OTDR) viewers) to run tests from both ends of a fiber link that is suspected of having an anomaly. However, since the ends of the fiber link at the closest Network Elements (NEs) may be separated by a great distance (e.g., more than 100 km), this manual testing process can be very time-consuming and labor intensive. Also, depending on the skill of the network operator, these steps may not provide accurate results, which can lead to unnecessary troubleshooting and maintenance time and expense.

Therefore, there is a need in the field of network management of fiber optic networks to provide an automated process for more accurately localizing anomalies in these networks and providing optimized localization information to a network operator. Also, it would be beneficial to expedite anomaly testing processes in the network.

BRIEF SUMMARY

The present disclosure is related to systems and methods for displaying a fiber optic network to allow a user to view the location of anomalies in the fiber optic network, if any exist. According to one embodiment, a system may be configured to include a processing device and a memory device configured to store an anomaly localization module. The anomaly localization module may include logic instructions, which, when executed, cause the processing device to display, on a Graphical User Interface (GUI), Network Elements (NEs) and fiber links of a fiber optic network on a generalized geographical map. Responsive to a user selection, the logic instructions may further cause the processing device to display, on the GUI, a physical fiber plant map based on obtained geographical coordinates of components associated with the fiber optic network.

According to another embodiment of the present disclosure, a non-transitory computer-readable medium may be configured to store computer logic having instructions that, when executed, cause one or more processing devices to display, on a Graphical User Interface (GUI), Network Elements (NEs) and fiber links of a fiber optic network on a generalized geographical map. Responsive to a user selection, the instructions, when executed, may further cause the one or more processing devices to display, on the GUI, a physical fiber plant map based on obtained geographical coordinates of components associated with the fiber optic network.

According to yet another embodiment of the present disclosure, a method may include the steps of displaying, on a Graphical User Interface (GUI), Network Elements (NEs) and fiber links of a fiber optic network on a generalized geographical map, and, responsive to a user selection, displaying, on the GUI, a physical fiber plant map based on obtained geographical coordinates of components associated with the fiber optic network.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
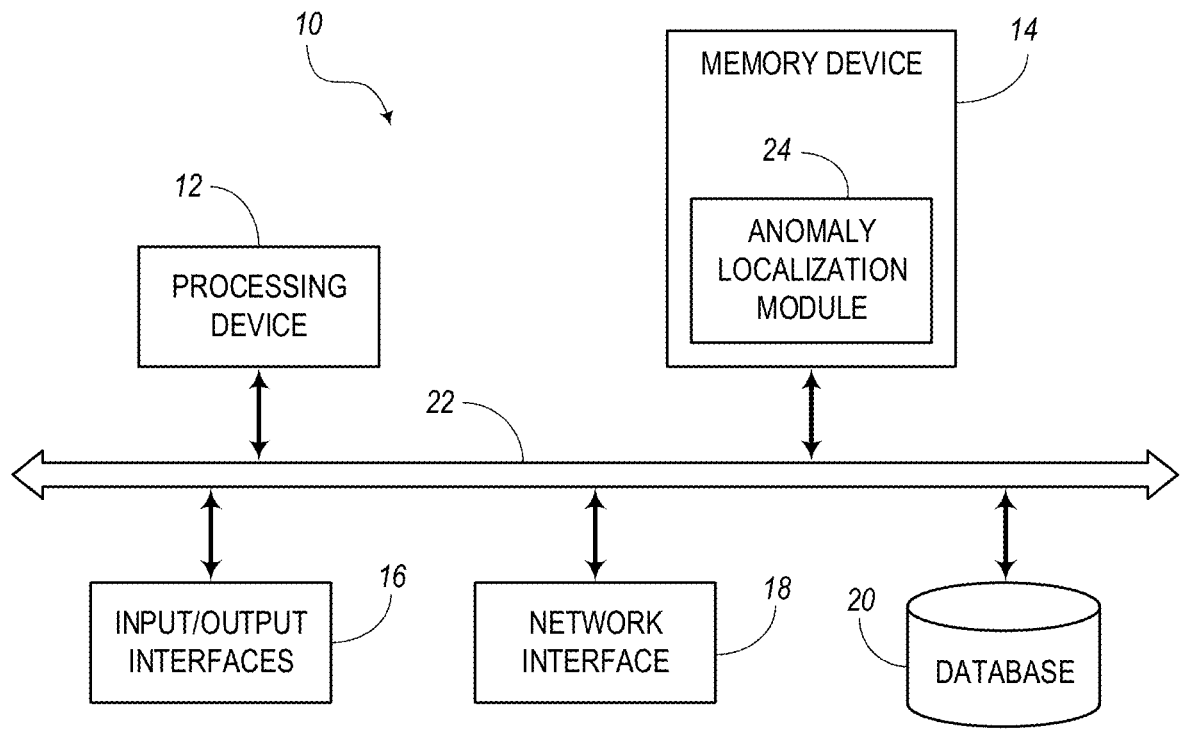
FIG. 1 is a block diagram illustrating a management system for managing a fiber optic network, according to various embodiments of the present disclosure.

The present disclosure relates to systems and methods for integrating data related to geographical coordinates of components of a fiber optic network into a management system being utilized by a network operator to expedite the investigation of anomalies in the fiber optic network. The geographical coordinates may include Keyhole Markup Language (KML) data that is recorded when fiber optic cable is installed in a fiber optic network, optical network, fiber plant, optical cable infrastructure, or other similar network or system (e.g., pipelines, utilities, electrical conduits, sewers, water mains, etc.). By integrating this data into a management system, the network operator will be able to localize the specific geographical locations of certain fiber events or anomalies after they occur.

Also, the present disclosure relates to systems and methods that are related to measuring and testing devices for detecting fiber events. For example, one measuring technique may include Optical Time-Domain Reflectometry (OTDR), where an optical source signal is transmitted from a node and the characteristics of any signal reflections are measured to determine if a physical fiber plant link includes an anomaly. For example, each of the detected anomalies or events may include a Loss of Signal (LOS), Loss of Frame (LOF), fault, fiber cut or break, fiber pinch, Optical Line Fail (OLF), or other type of physical defect or disruption to the optical signal. That is, an anomaly can be a physical defect on the physical fiber plant link and knowing its location (or approximate location) is critical for technicians to address the defect in a timely fashion. The quick localization of anomalies, as described herein, can expedite the process of performing any necessary repairs and provides an improvement over conventional systems that involve additional personnel for performing manual, in-field tests.

The present disclosure involves the mapping of a physical fiber plant link between two nodes, where data (e.g., Keyhole Markup Language (KML) data or Zipped KML (KMZ) data) regarding the physical fiber plant link is initially obtained during an installation process and the data is converted from this "logical" construct to a "physical" construct. The physical construct may relate to the display of the components of a fiber optic network within a geographical map having real-world physical features.

A management system, used by a network operator, may be configured with software, as described in the present disclosure, having a Graphical User Interface to display both the geographical locations of components of the fiber optic network and the results of OTDR measurements. Thus, the GUI is capable of providing a visual representation of the OTDR information in the context of a mapped network configuration within the Network Management System (NMS). Conventional systems may merely store coordinate data and not integrate this data into a management system computer program, as described in the present disclosure. Thus, according to the embodiments of the present disclosure, the network operator may be able to navigate through various views and may go from a logical view (showing a simplified or general depiction of components of the fiber optic network) to a physical view (showing greater details of the localization of components of the fiber optic network) within the same application. Therefore, this navigation can be performed within the same application without launching another separate program related to pinpoint locations with respect to other geographical features on a map.

The present embodiments are able to take the approximations of dark fiber data (obtained from a fiber optic cable installer) and combine these approximations with geographical coordinates of nodes or network elements of the fiber optic network and fiber links (e.g., physical fiber plant links) connecting neighboring nodes. The dark fiber data may include KML data. The present disclosure includes recognizing that a node may lie on a KML segment where a fiber is experiencing a fiber event or includes any type of anomaly (e.g., fiber break). The embodiments may include approximating the logical link computed distance with a likely physical link path.

When managing a network, operators may choose to have a view of the network which is mirrored in the real world. Geographical (e.g., Global Positioning System (GPS)) coordinates are used to assign the positions of the nodes and they are placed appropriately on the map. When there is an adjacency between those nodes, a link is drawn between those two nodes. This link appears in the generalized view (also referred to as a "logical link") to be a direct line between the two nodes and appears to follow the shortest path between those two nodes. However, it is typically unlikely that this path accurately represents the actual physical path of the link. The reality is that the physical link actually follows some real-world path much like a road between two cities. This may be referred to as a "physical link." One of the goals of the present disclosure is to be able to transform the logical link, which may be used in conventional systems, into a physical link showing a path more closely resembling the actual path that the physical fiber plant links follow.

In the field of fiber optic networks, one company (e.g., dark fiber provider) is usually responsible for installing the physical connection media (e.g., optical fiber cable) and another company (e.g., service provider) may purchase the right to use the installed fiber optic cable. A network manager or network operator may work in association with the service provider to manage, control, configure, and plan how the fiber optic network operates to optimize services and reduce costs.

As part of the process of placing the dark fiber, the installing company records the geographical (GPS) coordinates of the fiber about every 2-3 meters and preferably records whenever the fiber cable changes direction. A common format for recording this information is to use Keyhole Markup Language (KML). KML is a data modeling specification for expressing geographic annotation and visualization. The compressed or Zipped variant of the KML file is known as KMZ. Other variants for recording are also possible. By utilizing the geographical coordinates of the fiber in a management software product of a management system, a user may easily be able to navigate through display screens to replace the generic logical link with the physical link showing greater localization detail.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, processes, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a block diagram illustrating an embodiment of a management system 10 for managing a fiber optic network. In the illustrated embodiment, the management system 10 may be a digital computer that, in terms of hardware architecture, generally includes a processing device 12, a memory device 14, input/output (I/O) interfaces 16, a network interface 18, and a database 20. The memory device 14 may include a data store, database, or the like. It should be appreciated by those of ordinary skill in the art that FIG. 1 depicts the management system 10 in a simplified manner, where practical embodiments may include additional components and suitably configured processing logic to support known or conventional operating features that are not described in detail herein. The components (i.e., 12, 14, 16, 18, 20) are communicatively coupled via a local interface 22. The local interface 22 may be, for example, but not limited to, one or more buses or other wired or wireless connections. The local interface 22 may have additional elements, which are omitted for simplicity, such as controllers, buffers, caches, drivers, repeaters, receivers, among other elements, to enable communications. Further, the local interface 22 may include address, control, and/or data connections to enable appropriate communications among the components 12, 14, 16, 18, 20.

The processing device 12 is a hardware device adapted for at least executing software instructions. The processing device 12 may be any custom made or commercially available processor, a central processing unit (CPU), an auxiliary processor among several processors associated with the management system 10, a semiconductor-based microprocessor (in the form of a microchip or chip set), or generally any device for executing software instructions. When the management system 10 is in operation, the processing device 12 may be configured to execute software stored within the memory device 14, to communicate data to and from the memory device 14, and to generally control operations of the management system 10 pursuant to the software instructions.

It will be appreciated that some embodiments of the processing device 12 described herein may include one or more generic or specialized processors (e.g., microprocessors, Central Processing Units (CPUs), Digital Signal Processors (DSPs), Network Processors (NPs), Network Processing Units (NPUs), Graphics Processing Units (GPUs), Field Programmable Gate Arrays (FPGAs), and the like). The processing device 12 may also include unique stored program instructions (including both software and firmware) for control thereof to implement, in conjunction with certain non-processor circuits, some, most, or all of the functions of the processes and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 16 may be used to receive user input from and/or for providing system output to one or more devices or components. User input may be provided via, for example, a keyboard, touchpad, a mouse, and/or other input receiving devices. The system output may be provided via a display device, monitor, graphical user interface (GUI), a printer, and/or other user output devices. I/O interfaces 16 may include, for example, a serial port, a parallel port, a small computer system interface (SCSI), a serial ATA (SATA), a fiber channel, InfiniBand, iSCSI, a PCI Express interface (PCI-x), an infrared (IR) interface, a radio frequency (RF) interface, and/or a universal serial bus (USB) interface.

The network interface 18 may be used to enable the management system 10 to communicate over a network, such as the fiber optic network being tested, the Internet, a wide area network (WAN), a local area network (LAN), and the like. The network interface 18 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 18 may include address, control, and/or data connections to enable appropriate communications on the fiber optic network being monitored as described in the present disclosure.

The memory device 14 may include volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the memory device 14 may incorporate electronic, magnetic, optical, and/or other types of storage media. The memory device 14 may have a distributed architecture, where various components are situated remotely from one another, but can be accessed by the processing device 12. The software in memory device 14 may include one or more software programs, each of which may include an ordered listing of executable instructions for implementing logical functions. The software in the memory device 14 may also include a suitable operating system (O/S) and one or more computer programs. The operating system (O/S) essentially controls the execution of other computer programs, and provides scheduling, input-output control, file and data management, memory management, and communication control and related services. The computer programs may be configured to implement the various processes, algorithms, methods, techniques, etc. described herein.

The memory device 14 may include a data store used to store data. In one example, the data store may be located internal to the management system 10 and may include, for example, an internal hard drive connected to the local interface 22 in the management system 10. Additionally, in another embodiment, the data store may be located external to the management system 10 and may include, for example, an external hard drive connected to the I/O interfaces 16 (e.g., SCSI or USB connection). In a further embodiment, the data store may be connected to the management system 10 through a network and may include, for example, a network attached file server.

Moreover, some embodiments may include a non-transitory computer-readable storage medium having computer readable code stored in the memory device 14 for programming the management system 10 or other processor-equipped computer, server, appliance, device, circuit, etc., to perform functions as described herein. Examples of such non-transitory computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by the processing device 12 that, in response to such execution, cause the processing device 12 to perform a set of operations, steps, methods, processes, algorithms, functions, techniques, etc. as described herein for the various embodiments.

The management system 10 may be configured to include an anomaly localization module 24, which may be implemented in hardware, software, firmware, or any combination thereof. The anomaly localization module 24 may be stored as software or firmware in the memory device 14. The anomaly localization module 24 may allow a user (e.g., network operator) to navigate through various GUIs to view the fiber optic network at various levels of detail, such as a network view that may show the entire network on a large map or an anomaly map that may show a zoomed-in view of an estimated location of an anomaly and various physical features (e.g., roads, railroad tracks, utility infrastructures, etc.).

Figure 2:
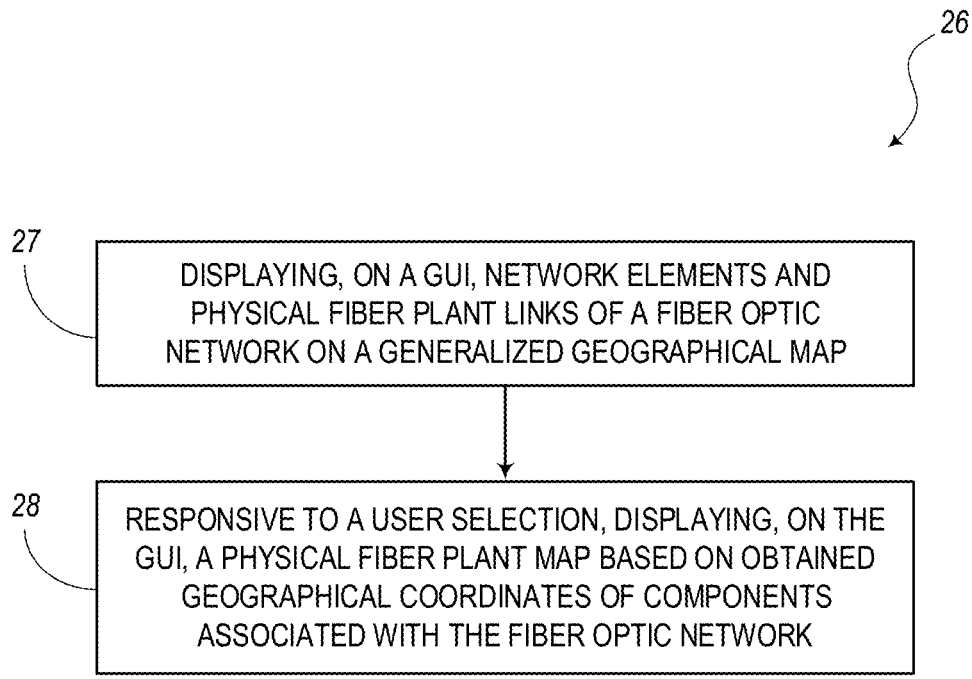
FIG. 2 is a flow diagram illustrating a general process for displaying a fiber optic network on a Graphical User Interface (GUI), according to various embodiments of the present disclosure.

FIG. 2 is a flow diagram illustrating an embodiment of a general process 26 for localizing a fiber optic network on a GUI. In this embodiment, the process 26 includes displaying, on the GUI, network elements and physical fiber plant links of the fiber optic network on (overlaying) a generalized geographical map, as indicated in block 27. Responsive to a user selection of a physical fiber plant link from the generalized geographical map, the process 26 further includes the step of displaying, on the GUI, a physical fiber plant map showing a zoomed-in view of the selected physical fiber plant link, as indicated in block 28. The physical fiber plant map is based on obtained geographical coordinates of components associated with the selected physical fiber plant link.

In particular, one goal of the systems and methods of the present disclosure is to localize anomalies in the fiber optic network. Anomalies may include faults, Loss of Signal (LOS), Loss of Frame (LOF), signal disruptions, signal attenuation, or other types of fiber events that may be caused by fiber cuts or breaks, fiber pinches, Optical Line Fail (OLF), or other situations. These anomalies may be detected in any number of ways, such as by performing Optical Time-Domain Reflectometry (OTDR) testing in which a Network Element (NE) or node sends a test signal along a physical fiber plant link and then receives signals that are reflected off the fiber anomalies with a specific identifiable optical signal pattern that is indicative of various types of anomalies. In addition to OTDR, anomalies may also be detected using other suitable techniques.

Although the present disclosure describes the display of anomalies in a fiber optic network, it should be noted that the embodiments discussed herein may also be used for displaying anomalies or other characteristics of other types of networks or systems. For example, some embodiments may be used for displaying electrical networks, networks having combinations of electrical and optical communication, public utilities using some type of measurable infrastructure (e.g., metal pipes, conductive lines, etc.), or other systems.

One purpose for displaying other networks or systems alongside the fiber plant data on the GUI is that it adds value for a network operator to be able to see other utilities and physical constructs in proximity to their fiber plant. These other networks can be added manually, in addition to the fiber plant KML data, but they serve to provide a more detailed view of what the provider's field technician will encounter when they set out to fix a physical fiber plant fault. In most cases, when a physical event has affected natural gas, hydro, water main, as well as photonic fiber conduits, unfortunately the telecommunication service provider is the last one allowed to go in to fix an anomaly since other utilities usually take precedence. Knowing the full picture of what is happening in the field will give the network operator a better estimate on the Mean Time-To-Repair (MTTR) for any fiber cut. Although it may be a simple fiber cut that needs to be fixed, but it may be necessary to wait hours or days before a technician may gain access to fix the problem.

By importing geographical data (e.g., KML data) indicative of the geographical location of the infrastructure of the fiber optic network, step 28 of the process 26 may be able to show the more specific zoomed-in view of a selected physical fiber plant link, such as one where an anomaly has been detected. By narrowing down where an anomaly is located, a network operator may be able to quickly determine an estimated geographical location of the anomaly along a physical fiber plant link. Thus, by viewing a more accurate anomaly location, a network operator can more quickly initiate any necessary troubleshooting actions to restore the fiber optic network. Also, the more accurate display may be configured to show the fiber optic network in the context of other nearby geographical features (e.g., roads, railroad tracks, electrical power lines, gas lines, rivers, streams, and other natural or man-made features).

Figure 3:
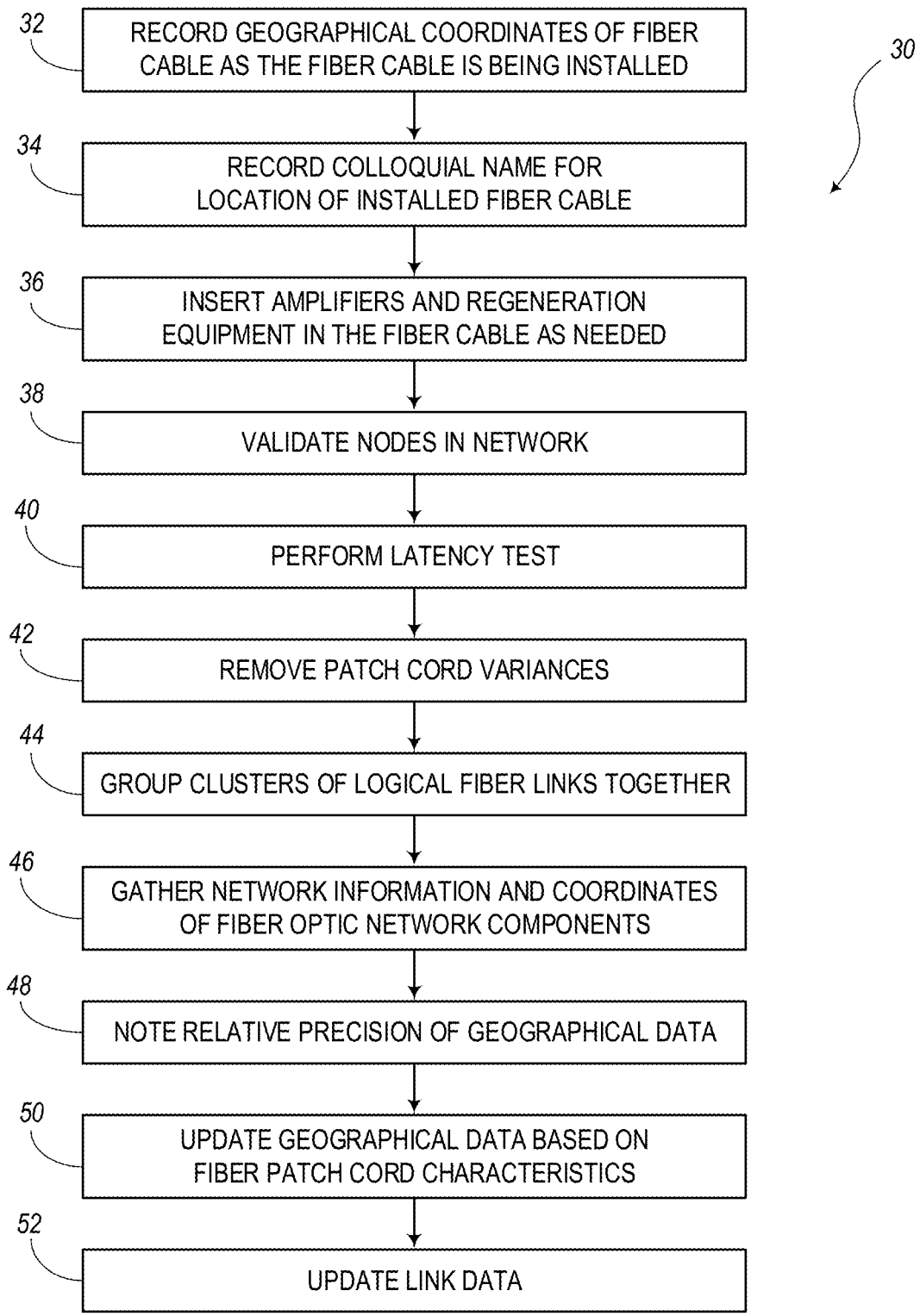
FIG. 3 is a flow diagram illustrating a process for obtaining data regarding geographical coordinates of components of a fiber optic network, according to various embodiments.

FIG. 3 is a flow diagram illustrating an embodiment of a process 30 for obtaining data regarding geographical coordinates of components of a fiber optic network. For example, the obtained data may be used for establishing a baseline architecture of the fiber optic network or other infrastructure. In some embodiments, the process 30 may be performed as a data gathering process for gathering topology information of the fiber optic network to thereby enable the anomaly localizing method 20 of FIG. 2. Some of the steps of the process 30 of FIG. 3 can be optional and/or may be omitted in some embodiments. According to the illustrated embodiment, the process 30 includes recording geographical coordinates of fiber cable as the fiber cable is being installed, as indicated in block 32. For example, as the fiber cable is being placed underground or installed overhead, geographical (e.g., Global Positioning System (GPS)) coordinates may be recorded for every length (e.g., about every three meters) of cable. The coordinates may be recorded as Keyhole Markup Language (KML), compressed or Zipped KML (KMZ), or other suitable data type.

The process 30 may take into account the transmission media being used, in order to be able to convert latency into distance. The recording of the coordinates may include loading KML segments into a database. The process 30 may gather all logical links in the network.

According to some embodiments, the process 30 also includes the optional step of recording a colloquial name (i.e., one that has meaning to an operator, technician, et al.) for the locations of the installed fiber cable, as indicated in block 34. After an installer has installed the fiber cable and recorded its location along the length of the fiber cable, a service provider may install additional equipment. As indicated in block 36, a step of inserting optical amplifiers and/or regeneration equipment in the fiber cable as needed. This step may include cutting the fiber cable and installing the necessary equipment for amplifying the optical signals traversing the fiber from one NE (node) to another.

The process 30 may further include validating nodes in the network, as indicated in block 38. A latency test may also be performed, as indicated in block 40. The latency test may be performed on all physical fiber plant links. The process 30 also includes removing any patch cord variances in the network, as indicated in block 42. The network operator may be able to enter a "slack" value (e.g., in meters) for a given fiber to remove patch cord variance. Furthermore, the process 30 includes grouping clusters of logical physical fiber plant links together, as indicated in block 44.

According to some embodiments, the grouping of clusters may include grouping the physical fiber plant links having common source and destination nodes (or Network Elements (NEs)). This may be performed by observing the distribution of the latency or distance values in the common source/destination nodes. Also, the systems and methods may include removing patch cord variances and paths to a Fiber Management System (FMS), Network Management System (NMS), fiber cable installer (dark fiber), or other entity. The process 30 may be configured to add "slack" to imported KML data to accommodate patch cord variance. The logical links (e.g., generalized links between nodes), which are clustered, may be grouped together. For example, for fiber cables that are within about 200 m (e.g., about 1 µs) of each other, the systems and processes may be adapted to account for clock resolution of the different latency calculation schemes being used. For instance, 1 us may usually be fine for Ethernet LLDP. The process 30 also includes gathering network information and coordinates of fiber optic network components, as indicated in block 46.

The process 30 also includes noting the relative precision of geographical data, as indicated in block 48, updating geographical data based on the fiber patch cord characteristic, as indicated in block 50, and updating the link data (block 52). The systems of the present disclosure may be configured to gather all nodes and site information and all geographical coordinate information. Block 48 may be performed by noting the relative precision of GPS data and may need to adjust the expected resolution for data approximation. The systems may determine the expected fiber patch cord used within a site. A good approximation for this is the type of node. An amplification node is typically placed in a hut and therefore the patch cords are relatively short (e.g., about 100 m). An add/drop site within a data center may have patch cords in excess of 2 km.

For adjusting the expected resolution of the geographical coordinates, the process 30 may further be defined by computing the best, expected, and worse case patch cord slack. The KML segments may be examined to find data within patch cord slack of a recorded position of a node. The systems may then try to align the node GPS coordinates to the dark fiber (installer-based) KML data. Also, the process 30 may include performing a second calculation to determine if a KML segment has been broken. For example, for an amplification hut, a node may generally be on the segment and may be less than best-case patch cord slack. At this point, the KML database can be updated.

With a set of useful KML starting points, the process 30 may further include steps for each link with common source/destination nodes and approximately equal fiber distances. For example, the process 30 may also compute all paths (from source to destination) whose distance is less than the sum logical link distance (direct path from source to destination) and each node's worst-case patch cord data slack. All paths whose distance is less than the logical link computed distance can be discarded. If no path remains, then this error condition may be noted and may be indicative of having incomplete KML data. If one path remains, then this path can be recorded against the logical link group. If more than one path remains, then this error condition can be noted and all the paths in this group can be recorded.

When process 30 is executed, all non-error data may be ready to be consumed by a FMS or NMS to allow a network operator to move from a simple logical link (direct line) representations to a physical fiber plant map (e.g., more closely following the actual geographic path with respect to a real-world map. The physical physical fiber plant map may be considered as a pinpointing system for more accurately representing the actual paths of the fiber optic cable. Logical links with no computed physical links may require reconciling when additional KML data is available. Logical links with more than one physical link may require reconciling at the network operator's convenience or when the data is needed for consumption.

Physical Link and KML Considerations

One of the challenges is that the KML data typically contains physical address location and has no representation in the network operator's understanding or view of the network. The KML data may contain a physical address or title to a deeded property/location, whereas the network operator may use a colloquial or descriptive name sometimes referred to as a "node name," "shelf name," or a "common language location indicator (CLLI)."

A second challenge is that the dark fiber (i.e., fiber as originally installed by a third-party installer) in the network element may not share GPS coordinates. Typically, the dark fiber may start at a wall of a building, whereas the network element or shelf of interest might be much farther within the building, possibly hundreds of meters away. The shelf may be attached to the dark fiber via a series of patch cords and quite possibly a Fiber Management System (FMS). Typically, the network element does not contain the length of patch cords up to the dark fiber and thus the KML data may include no indication of this patch cord either.

A third challenge is that the dark fiber operator may have no understanding of how the network operator may use the installed fiber. It is possible that the network operator may break the dark fiber in order to place amplification or regeneration equipment as needed.

Logical Link Considerations

Some equipment that uses a link can measure the distance or latency (e.g., round-trip latency). Some standard processes may also include Optical Transport Network (OTN) Delayed Measurement (DM), IEEE 801.3ag (Continuity, Fault, Management (CFM)), or other processes. In some embodiments, proprietary processes may also be used.

Some equipment can also determine some information about a far end point. Some standard processes may include OTN Trail Trace Indicator (TTI) or Link Layer Discovery Protocol (LLDP). Other proprietary processes may also be used. Some deployed networks may use more than one technology to achieve the connection (e.g., Ethernet over optical) or other interlayer adjacency traceability processes.

The technologies used to support the logical link may be able to determine source and destination nodes. With an understanding of the media used (e.g., microwave, copper cable, optical fiber), it may be possible to determine the approximate distance away. However, in this case, there may be no inherent understanding of the physical path used.

Node Considerations

The geographical (e.g., GPS) coordinates of the node/site may be inaccurate due to the technology originally used to calculate the coordinates. For instance, older technology is typically not as precise as newer technology. Expected digits of precision may be missing, depending on the technology that was used to calculate the coordinates.

NEs, or nodes, may include multiple interfaces. Some of these interfaces may be used as endpoints to the physical fiber plant links that comprise the network of interest. Many nodes may not be connected to just one other node, but rather may be connected to a plurality of other nodes. It is possible to use the logical link adjacency to associate interface on a node with another node and interface. This may help to limit the scope of the problem. Regarding parallel rails, even though logical links may show an adjacency between two nodes, it is possible and likely that the physical path used is different.

Thus, one of the challenges may be that logical links and KML data are unlikely to share source and destination GPS endpoints. Another challenge is that a node within a site may have many node adjacencies. A physical link may share a common route leaving a site before branching onto its true destination. Also, KML fragments may contain a node. Yet another challenge is that patch panel data may be unaccounted for, which may account for up to 2 km per endpoint on a logical link. To address these challenges, the embodiments of the systems and methods of the present disclosure may involve mapping of a link between two nodes from a first representation of a logical (generalized) construct to a physical (real-world geographical) construct.

Figure 4:
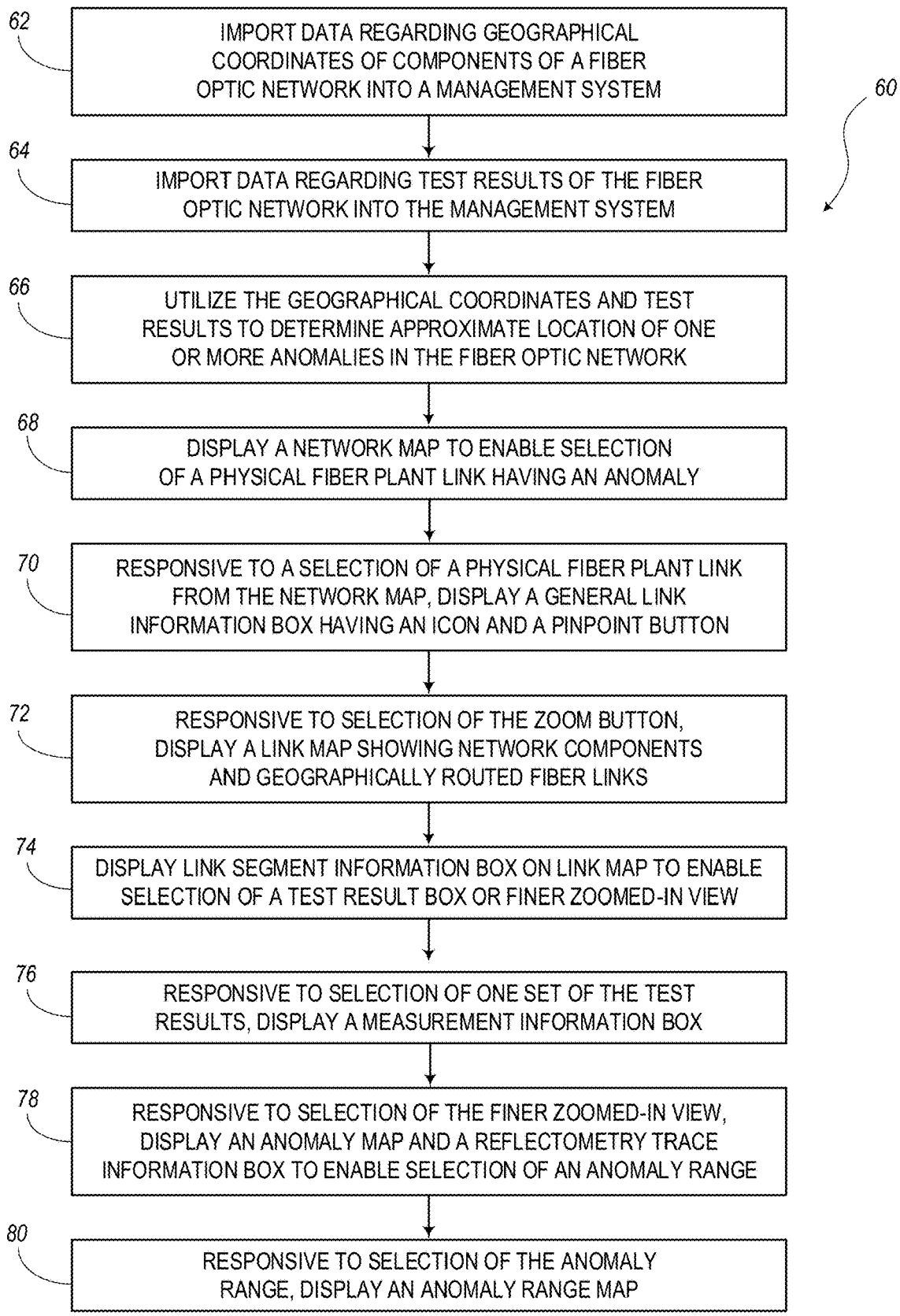
FIG. 4 is a flow diagram illustrating a process for importing the data regarding geographical coordinates obtained in the process of FIG. 3 and displaying the fiber optic network based on the imported data, according to various embodiments.

FIG. 4 is a flow diagram illustrating an embodiment of a process 60 for importing the data regarding geographical coordinates (e.g., obtained in the process of FIG. 3) and displaying the fiber optic network based on the imported data and other measurement data (e.g., reflectometry data). The fiber optic network may include Network Elements (NEs) or nodes, optical fiber spanning between neighboring NEs, optical amplifiers, regeneration equipment, and/or other equipment.

In the embodiment shown, the process 60 includes importing data regarding geographical (e.g., GPS) coordinates of components of a fiber optic network into a management system, as indicated in block 62. The importing step of block 62 may be performed by a service provider in a manual process or may involve an automatic import of data using the management system of the service provider. For example, the management system may be an FMS, an NMS, or other suitable managing hardware/software. The imported data may be the data obtain by the process 30 of FIG. 3 or other suitable process where geographical coordinates (e.g., KML or KMZ data) are recorded, such as during installation of the fiber optic cable of the network. Using this data, it may be possible to replace logical data in a management system representing a generalized fiber path from one node to another with physical data representing a more specific localization of the fiber path in the context of a geographical map.

Furthermore, process 60 includes the step of also importing data regarding test results of the fiber optic network into the management system (e.g., NMS), as indicated in block 34. For example, the test results may be results of running an Optical Time-Domain Reflectometry (OTDR) test or other suitable measuring or testing process. The test results may be indicative of one or more anomalies in the fiber optic network. The test results can also be integrated into a Geographic Information System (GIS) of the management system.

The process 60 also includes utilizing the imported geographical coordinates (obtained in block 32) and the test results (obtained in block 34) to determine an approximate location of one or more anomalies (e.g., fiber breaks, fiber events, etc.) in the fiber optic network, as indicated in block 36. This step may include localizing one or more fiber events, which can be used to optimize troubleshooting strategies. A "network map" (e.g., network map 92 shown in FIG. 5) may be displayed on a GUI (e.g., GUI 90 shown in FIG. 5), as indicated in block 38. The network map may show a generalized view of the fiber optic network superimposed over a geographical map (e.g., a map including roads, railways, utilities, etc.). The network map 92 may show physical fiber plant links between NEs, fiber pairs, fiber bundles, etc. The network map 92 may represent the connectivity between NEs and may not necessarily include raw physical fiber. In some embodiments, a standard map may originally be included in a product, where the standard map may include roads, railways, waterways, political borders, city names, etc. However, this standard map may be configured without including utilities. In this case, a network operator (or service provider) may acquire separate utility KML map data from respective utilities and load this information into the application in order to see utilities on their network fiber plant map. In some embodiments, the displayed network map may show each respective physical fiber plant link between adjacent nodes as straight lines for showing a generalized connection, without regard to actual fiber paths. The network map may also display an indication that one or more of the physical fiber plant links includes an anomaly. This link may be highlighted in the display to enable a network operator to select one of the physical fiber plant links having an anomaly.

In general, some embodiments may preclude the importing of KML/KMZ fiber plant data that will facilitate the display of the fiber plant physical routing superimposed on the base NMS map, which may include (e.g., by default in some embodiments) roads, rivers, waterways, and perhaps rail-lines. The information may be similar to what a user may typically get using open-street map, Google map, etc. If the user wants to concurrently display pipelines (e.g., oil, gas, etc.), electrical/hydro cables and conduits, water mains, sewage lines, etc., each one of those different physical maps can be imported from KML/KMZ data supplied by the respective utilities. These may be available to a service provider customer/user but may be extra. In some cases, it may be possible to find public maps of various utility systems (e.g., coal, electric, gas, etc.) in a certain region and the systems can be manually added to a demo version of the anomaly localization module 24 to showcase how powerful anomaly localization can be when extra data can be obtained about what may be buried alongside a fiber plant.

Responsive to a user (e.g., network operator) selecting a physical fiber plant link from the network map (e.g., a link having an anomaly), the process 60 includes displaying a general link information box or "selected link summary pod" (e.g., box 102 shown in FIG. 5) superimposed over the network map. The general link information box may include an icon 104 and a pinpoint button 106. The pinpoint button 106 may be configured to enable the user to select an integration point between the MCP network map and the pinpoint fiber plant map. The icon (e.g., icon 104) indicates that test data (e.g., OTDR data) exists for the selected link and that an OTDR trace has been recently run on the selected physical fiber plant link from the network map. Presumably, the operator has selected that particular physical fiber plant link because it appears in a down or troubled state (i.e., the general link information box 102 may indicated that the link is down). The pinpoint button 106 lets the operator open/ launch or transition from the general network map to a pinpoint fiber plant map with the selected link in context. The fiber plant map is launched with the selected link in context at the appropriate zoom level to display the entire link (from NE-a to NE-z) with all intervening amplifier NEs in between also being shown in FIG. 6.

Figure 6:
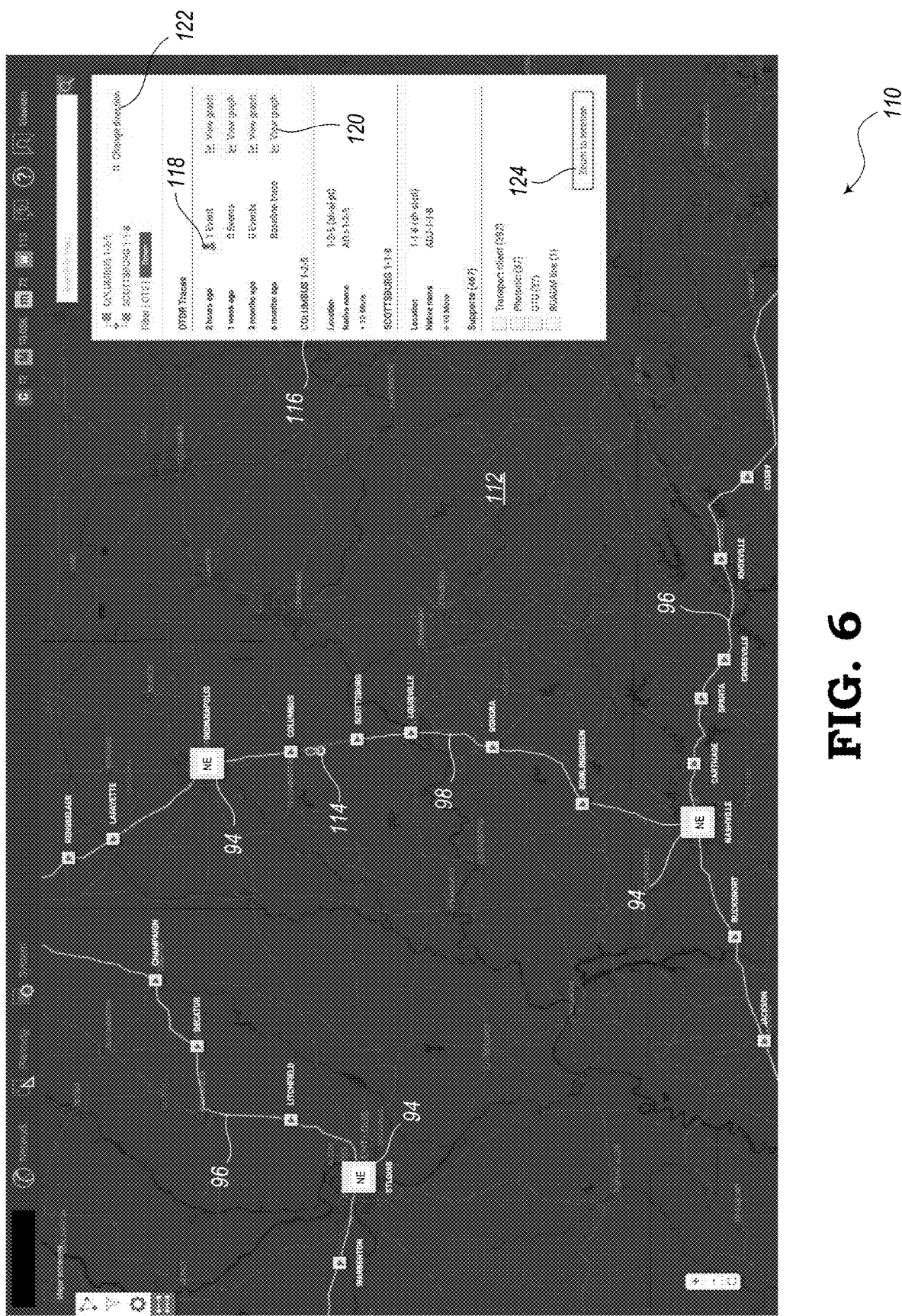
FIG. 6 is a screen shot of a GUI for displaying a physical fiber plant map, according to various embodiments.

As indicated in block 72, the process 60 further includes the step of displaying a "link map" or "physical fiber plant map" (e.g., fiber plant map 112 shown in FIG. 6) on a GUI (e.g., GUI 110 shown in FIG. 6) responsive to the selection of the zoom button 106. The fiber plant map 112 is derived from the imported KML data. It should be noted at this point that physical fiber plant links 96, 98 in FIG. 6 are no longer straight lines but rather the actual route that the fiber takes, showing every slight change of direction recorded in the KML. The fiber plant map 112 also shows the network components of the fiber optic network in a zoomed-in fashion and shows how the physical fiber plant links are geographically routed. The physical fiber plant map may show an entire link that is substantially centered in the GUI and is displayed from one edge of the GUI to the other to maximize the view of the link. In this respect, other links may also be partially or fully displayed as well. The physical fiber plant map may further show other features of the fiber optic network such as Reconfigurable Optical Add/Drop Multiplexers (ROADMs), optical amplifiers, and other network components. By using the actual geographical coordinates of the fiber optic cables (e.g., as described with respect to FIG. 3), the fiber plant map 112 may be configured to show how the physical fiber plant links are geographically routed, specifically the way they are routed with respect to other geographical features, such as roads, railways, utility (e.g., electric, gas, water, etc.) conduits, rivers, streams, lakes, and other natural or man-made features. Again, the utilities are not part of the standard base map and will need to be loaded as separate KML data maps if available.

The process 60 of FIG. 4 further includes displaying a link segment information box (e.g., box 116 shown in FIG. 6) on top of the fiber plant map 112. The link segment information box may include an icon (e.g., icon 118), an expansion prompt (e.g., "View Graph" prompt 120), or other feature to enable selection of a test result box to show details of the test results regarding the selected physical fiber plant link. Although FIG. 6 shows only one OTDR trace with existing test results (only one event), there may be multiple sets of test results for selection in the link segment information box. Also, the link segment information box may further include a zoom button (e.g., zoom-to-location button 124) or other feature to enable an even finer zoomed-in view to the finest street level zoom possible from the loaded KML data. This may be a 100 m to 300 m zoom level.

Responsive to a user selection of one set of test results (e.g., available for selection as described with respect to block 74), the process 60 includes the step of displaying a measurement information box (e.g., reflectometry information box 132 shown in FIG. 7), as indicated in block 76. The measurement information box may include calculated GIS or GPS coordinates. In some embodiments, the measurement information box may display an OTDR trace (or SOR file) 132 that slides out of the OTDR trace information box 136 on demand when the user has selected the "View Graph" button 120 on the OTDR trace information box 136.

Figure 7:
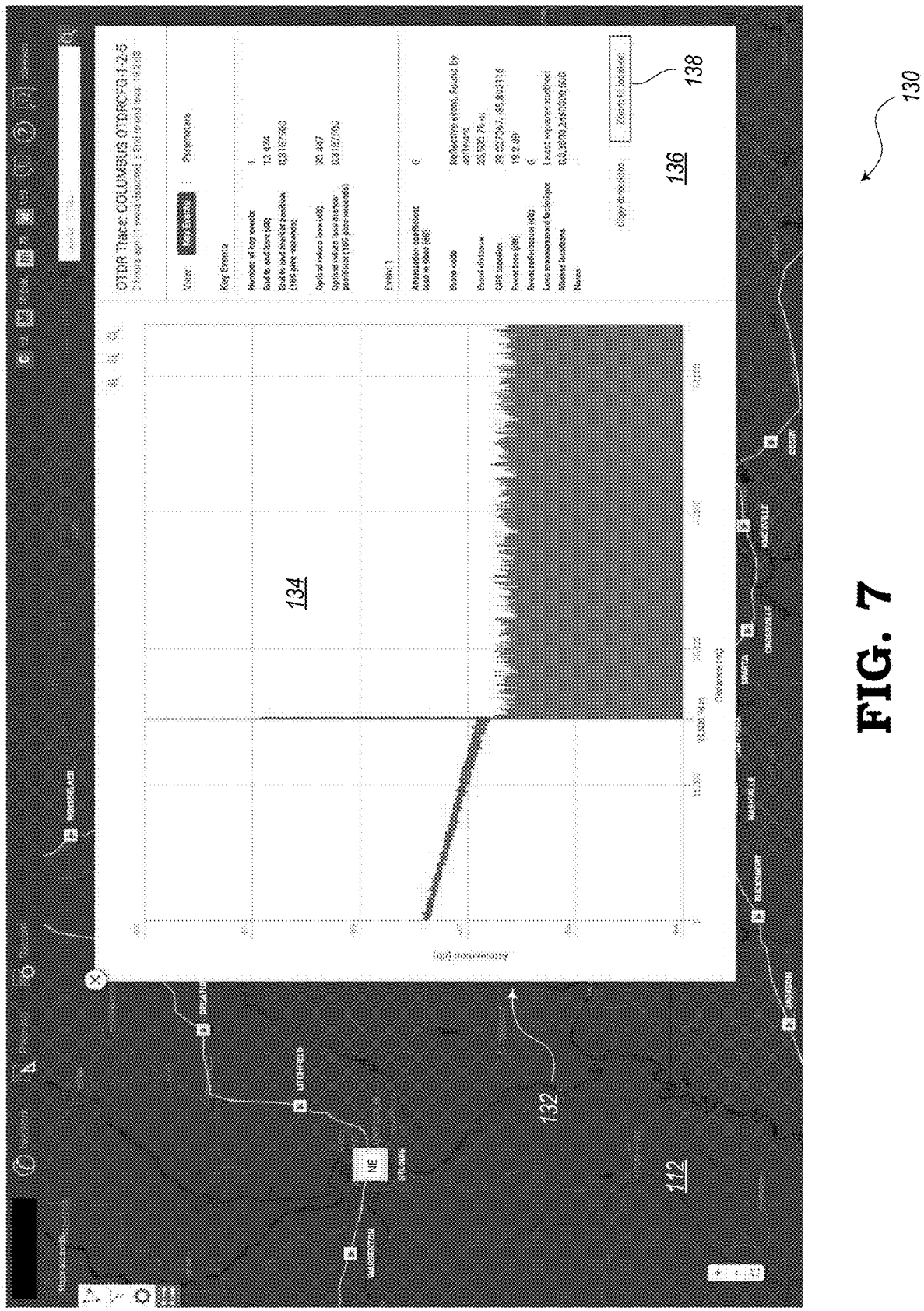
FIG. 7 is a screen shot of a GUI for displaying a reflectometry information box superimposed over the physical fiber plant map of FIG. 6, according to various embodiments.
Figure 8:
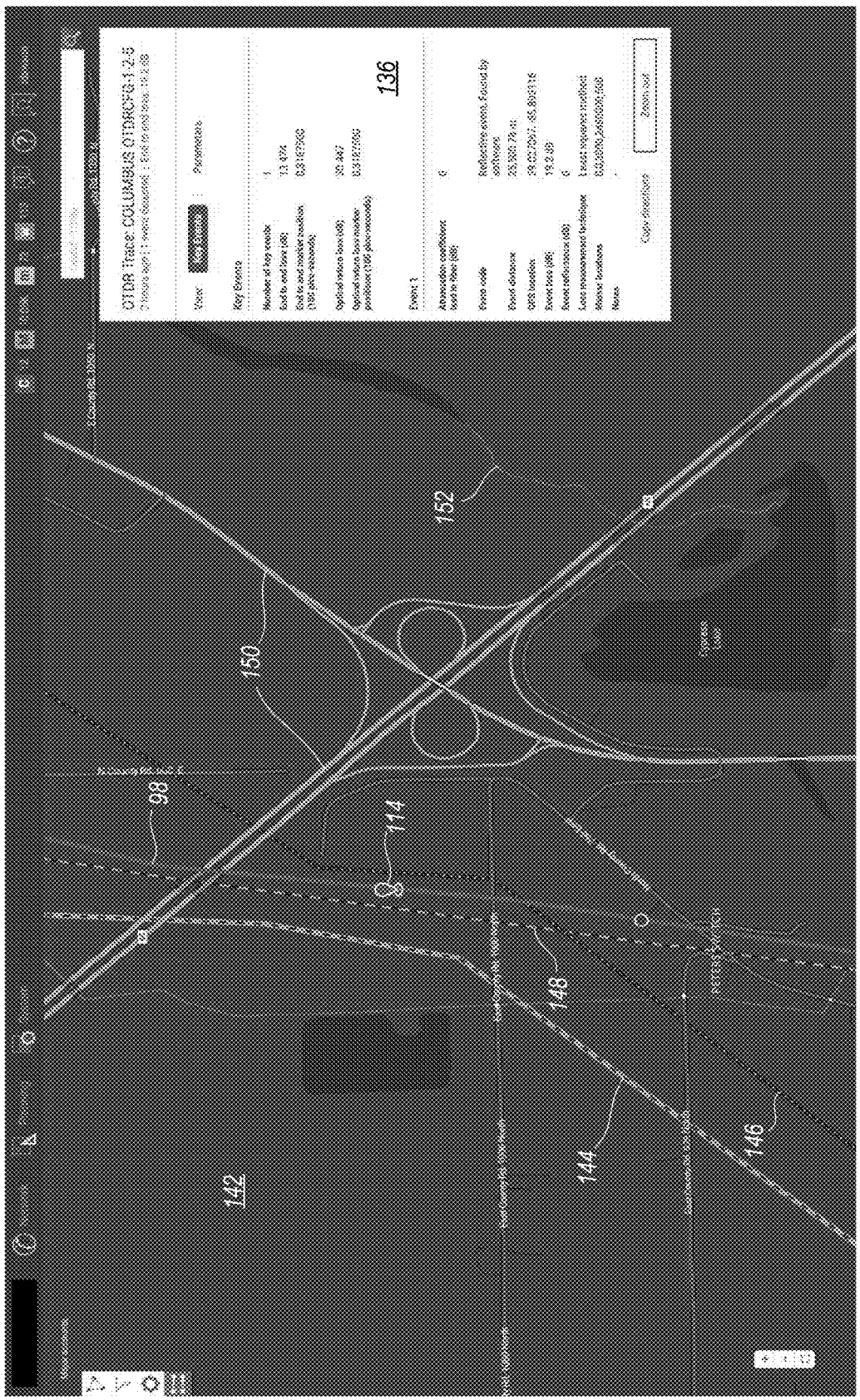
FIG. 8 is a screen shot of a GUI for displaying an anomaly map, according to various embodiments.

Responsive to a user selection of the finer zoomed-in view, the process 60 includes the step of displaying a zoomed-in view of the fiber plant map (e.g., fiber plant map 142 shown in FIG. 8) on a new GUI (e.g., GUI 140 shown in FIG. 8), as indicated in block 78, to show the finest street level zoom available (e.g., down to a 100-200 m zoom level) if a finer view is available. FIGS. 6-8 may show the fiber plant map at different zoom levels. A reflectometry track information box (or other measurement information box) may be superimposed over the anomaly map to show details of the measurement results. The information box or other part of the anomaly map may include a zoom-in button or other suitable selection feature to enable selection of an anomaly range, which may be defined as a range of estimated locations along the fiber optic cable where the anomaly is located.

Responsive to selection of the anomaly range (e.g., made available in the anomaly map described with respect to block 78), the process 60 includes displaying an anomaly range map (e.g., anomaly range map 162 shown in FIG. 9), as indicated in block 80. It should be noted that the blocks 70, 72, 76, 78, 80 may be based on various user selections, such that certain actions may be performed in response to such user selections. The blocks of the process 60 may therefore be performed in any suitable order and not necessarily performed in the order in which they appear in FIG. 4. In some embodiments, certain views and displays may be provided on the GUI without user selection but may be displayed instead in response to other triggers. For example, switching the view may be triggered by a simple toggle function on the GUI. The anomaly may be determined to be at a certain approximate location (e.g., as represented by icon 114), and, with about 95% certainty, it may be estimated that the actual location of the anomaly is within the anomaly range (e.g., range 164 shown in FIG. 9). The 95% confidence interval may be centered around the GPS location listed in the OTDR trace information box 136 shown in FIG. 8. That is, a user may be 95% confident that the anomaly is somewhere along the anomaly range with the stated GPS location at its center. In some embodiments, the anomaly range 164 may be about 100 meters on either side of the estimated anomaly location for a total length of about 200 meters, i.e., on the order of hundreds of meters. The anomaly range may be used to better pinpoint the location of anomaly.

As mentioned above, the confidence of estimating the location of the anomaly within the anomaly range may be about 95%. This may be the result of performing measuring or testing on the links as described above. With a OTDR or other test that may be initiated from a node, better results may be obtained by performing the test twice, where one test is performed from one node adjacent to the physical fiber plant link connecting two nodes and another test is performed from the other node adjacent to the physical fiber plant link. With results from two different directions, the reflectometry test or other test may provide a more actual localization of the anomaly.

Therefore, the systems and methods of the present disclosure may be configured to integrate KML data of the locations of components of the fiber optic network data in addition to OTDR trace data (or other measurement data) into the management system GIS/GPS map. This can aid network operators to localize fiber events in its geographical context thus offering a solution to optimize troubleshooting of fiber disruption events (e.g., cuts, pinches, etc.) from within the management system (e.g., FMS, NMS, etc.). The KML or KMZ files can be imported by a service provider into their management system using this finer-view or pinpointing application for localizing anomalies.

KML or KMZ files may provide accurate geo-located coordinates of where a service provider's fiber optic network components (e.g., fiber plant, cables, conduits, fibers, etc.) are laid out in the real world. Some service providers may have data in the KML/KMZ format, either from their own GIS/GPS or from a third-party fiber supplier. However, conventional systems do not import this data into a management system (e.g., system 10, FMS, NMS, etc.), as described in the present disclosure.

Furthermore, the imported KML fiber data can include waypoints and placemarks which can be associated or paired with NEs, access points, patch panels, glass-throughs, etc. The association can be done automatically or manually may be based on reconciling the geographical coordinates found in the KML data with what the management system may already know about the NE network, such as GIS/GPS locations of NEs entered at latitude and longitude coordinates.

OTDR traces can be scheduled to run on a regular basis along various fiber routes or can be triggered to automatically run when specific faults are detected (e.g., when an OLF, LOF, or LOS alarm is received) in the fiber routes. OTDR functionality may be built into the NEs to enable the NEs to trigger the OTDR runs according to a schedule or in response to a specific fault.

When a user selects a troubled physical fiber plant link from the network map, the associated summary information for the link can be used to indicate whether a new OTDR trace exists. The user may also be allowed to select a button or icon for displaying a zoom-in view, which can be any suitable feature of the GUI as a launch point to open a "closer," zoomed-in, or pinpointed view using the application (e.g., anomaly localization module 24).

If the user launches a portion of the anomaly localization module 24 from a summary information box for selecting a physical fiber plant link in the network geographical map, the GUI view is transitioned to its KML-enabled fiber optic network map, with the selected physical fiber plant link in its physical context, which may be focused in to show ROADMs, amplifiers, etc. Thus, a user can visualize how the fiber for the selected physical fiber plant link is actually physically routed. In addition to the selected fiber segment, the KML map may also show all physical fiber plant links as actual physically routed fibers.

A summary information box of the selected link may be transformed into a summary information box for the affected fiber segment. This view may also display additional pinpointed data (e.g., OTDR trace history, the NEs between which the OTDR traces ran, and other relevant fiber optic network data). The user may also be free to select other fiber segments in this view, which may then be changed in the summary box.

In the zoomed-in or pinpointed (KML) map, the user can see where the OTDR detected the physical location of fiber events, which would typically be between two neighboring NEs. In addition, the user will have access to display any OTDR trace graph that has been run along that fiber segment, in context.

The OTDR trace graph may also contain the calculated GIS/GPS coordinates of the detected fiber event. If more detailed KML data is loaded, the user can zoom down to a finer zoom level (e.g., 300 m zoom) to see where the fiber event is located, within about a 95% confidence. An interval range (or anomaly range) can be displayed around the pinpointed estimated location (e.g., shown as a pin icon 114 on the fiber plant map 142, 162). The confidence interval ranges can be obtained both in scenarios where OTDR data is available only in one direction or in scenarios where OTDR traces are run on the link in both directions.

Those skilled in the pertinent art will appreciate that various embodiments may be described in terms of logical blocks, modules, circuits, algorithms, steps, and sequences of actions, which may be performed or otherwise controlled with a general purpose processor, a DSP, an application specific integrated circuit (ASIC), a field programmable gate array, programmable logic devices, discrete gates, transistor logic, discrete hardware components, elements associated with a computing device, or any suitable combination thereof designed to perform or otherwise control the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, those skilled in the pertinent art will appreciate that the various illustrative logical blocks, modules, circuits, algorithms, and steps described in connection with the embodiments described in the present disclosure may be implemented as electronic hardware, computer software, or any suitable combinations thereof. To clearly illustrate this interchangeability of hardware and software, various illustrative components, blocks, modules, circuits, algorithms, and steps have been described herein in terms of their general functionality. Whether such functionality is implemented in hardware or software depends upon the particular application and design constraints, and those skilled in the pertinent art may implement the described functionality in various ways to suit each particular application, but such implementation decisions should not be interpreted as causing a departure from the scope or spirit of the present disclosure. Additionally, the various logical blocks, modules, circuits, algorithms, steps, and sequences of actions described herein can be considered to be embodied entirely within any form of computer readable storage medium having stored therein a corresponding set of computer instructions that upon execution would cause an associated processor to perform the functionality described herein. Thus, the various aspects and embodiments disclosed herein may be embodied in a number of different forms, all of which have been contemplated to be within the scope or spirit of the claimed subject matter. In addition, for each of the embodiments described herein, the corresponding form of any such embodiments may be described herein as, for example, "logic configured to" perform the described action.

FIGS. 5-9 show screen shots of various GUIs for displaying aspects of the fiber optic network being monitored. The GUIs may be incorporated in a computing system that may be available to a network operator. In particular, the computing system may run the anomaly localization module 24 or other suitable program implemented in hardware, software, and/or firmware and may be configured to execute at least part of the processes described with respect to FIGS. 2-4. Some actions may be taken in response to selections made by the network operator, such as initiating a zoomed-in or pinpointing view based on the user selecting a zoom-in button or other prompt.

Figure 5:
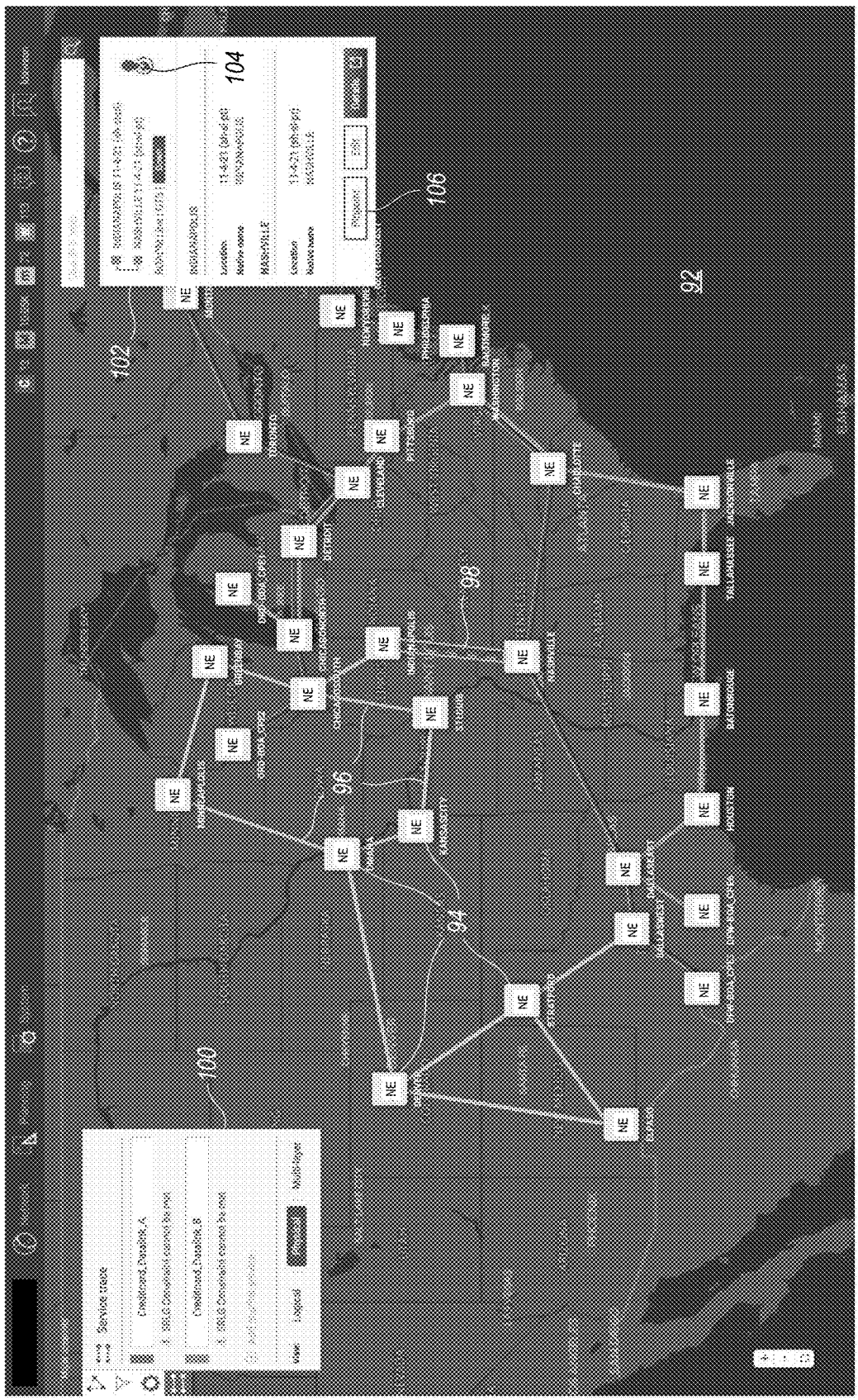
FIG. 5 is a screen shot of a GUI for displaying the fiber optic network in a generalized geographical map, according to various embodiments.

FIG. 5 is a screen shot showing an example view of a GUI 90 for displaying the fiber optic network in a generalized geographical map or network map 92. The screen shot also shows the integration point of an OTDR/pinpoint viewer application with the generalized geographical map or network map 92. The fiber optic network includes Network Elements (NEs) 94 connected by physical fiber plant links 96 in the network map 92. When one or more anomalies are detected in the fiber optic network, a highlighted indicator 98 may be shown to specify the identity and general location of a physical fiber plant link 94 having an anomaly. The GUI 90 may further include a service trace box 100 superimposed over a top left corner of the network map 92.

If the user (e.g., network operator) selects (e.g., mouse clicks) the highlighted indicator 98, the GUI 90 may be configured to create a general link information box 102 or "link summary pod," which may be superimposed over a top right corner of the network map 92. The general link information box 102 may show more information about the selected link 98, such as the NE names of the respective nodes (e.g., "Indianapolis" and "Nashville" in this case). The NE names may be assigned by the service provider and may be friendly and familiar, not cryptic or CLLI-based as many providers do. The box 102 may also include a pinpoint icon 104, which may indicate that an OTDR trace has auto-run (triggered by a link fault condition). The pinpoint icon 104 may also indicate that OTDR data and/or pinpointing data (e.g., to enable a transition from the general network map to an in-context fiber plant map) are available. In this respect, the pinpoint icon 104 may be an improvement over conventional systems, whereby the pinpoint icon 104 can show the existence of this information without requiring the network operator to unnecessarily looking up OTDR data that does not exist.

The general link information box 102 may also include a pinpoint button 106 or other suitable type of selection feature to enable the user to view a further pinpointed or zoomed-in version of the fiber optic network. By selecting the pinpoint button 106, the program may be configured to change the GUI view 90 to the GUI view 110 shown in FIG. 6 for displaying a map with the selected link.

FIG. 6 is a screen shot showing an example of a GUI 110 for displaying a fiber plant map 112. The specific link 98 (e.g., link between Indianapolis and Nashville) of the plurality of links 96 is shown substantially in the middle of the GUI view 110 in the fiber plant map 112. In this zoomed-in view, the fiber plant map 112 further shows amplifiers or regeneration devices between the two nodes 94. It should also be noted that the program is configured to utilize the specific geographical data of the locations of the fiber optic cable to integrate this data to better show the actual route of the physical fiber plant link 98, as opposed to the network map 92 shown in FIG. 5 that merely shows the physical fiber plant links 96 as straight lines. In particular, the path of the physical fiber plant link 98 shows the serpentine routing, which is indicative of the actual location of the physical fiber plant link 98 as it was originally laid out. The path in this example includes the link 98 passing through nodes designated by their NE names, as assigned by the service provider, as "Columbus," "Scottsburg," "Louisville," "Sonora," and "Bowling Green." In this example, the names represent actual locations, but in operation, the NE names may be more akin to "Columbus-AMP_002."

The fiber plant map 112 also include an icon 114 that indicates an approximate location where an anomaly may be found. In this example, the icon 114 indicates an anomaly between Columbus and Scottsburg. The program for localizing the anomalies of a fiber optic network may be configured to receive OTDR information (or other measurement data), which can be used to estimate the location of the anomaly 114. According to this example, an OTDR trace may be run from one or both of the two closest adjacent NEs 94 reporting the alarm/fault (e.g., LOS, OLF, LOF, etc.) on the physical fiber plant link, whereby the two closest adjacent NEs 94 or NE amps in this example are designated as Columbus and Scottsburg. Performing OTDR from both nodes 94 may provide more accurate localization of the anomaly. As such, results can be combined to find an intermediate location where the anomaly may exist.

The GUI 110 may also display a link segment information box 116 for showing information of a particular segment (e.g., Columbus to Scottsburg) of the faulty physical fiber plant link 98. In this example, the OTDR trace is shown from a test initiated in Columbus. A "change direction" option 122 may be selected to change to an OTDR trace initiated in Scottsburg, if bidirectional OTDR data exists. The box 116 may further include an icon 118 which shows OTDR traces that detect anomalies (e.g., fiber events). A user can select this icon 118 to see further details of this OTDR trace. In addition, a "view graph" prompt 120 may be provided on the box 116 to allow the user to see the further details of the OTDR trace. A history of OTDR traces can be shown in the box 116, which may be listed in reverse chronological order.

When one of the prompts 118, 120, 122 is selected, the program may be configured to change the GUI view 110 to the view 130 shown in FIG. 7. A zoom-to-location button 124 allows a user to select a further zoomed-in view, if available. An example of a further zoom-in view is shown in FIG. 8.

FIG. 7 is a screen shot showing an example of a GUI 130 for displaying an OTDR trace or a Standard OTDR Record (SOR) file, such as a reflectometry information box 132 superimposed over the fiber plant map 112 of FIG. 6. The SOR file is a data file saved in the Standard Optical Time-Domain Reflectometry (OTDR) Record (SOR) format. The SOR file contains fiber trace data, which includes the distance, reflectance, loss, and fiber attenuation measurements, recorded by an OTDR instrument when testing a fiber optic cable. The box 132 may include an SOR file or an attenuation graph 134 and an OTDR trace information box 136. In some embodiments, the OTDR trace (or SOR file) may be configured to "slide out" of the OTDR trace information box 136 on demand when the user has selected the "View Graph" button 120 on the OTDR trace information box 136. The attenuation graph 134 shows the attenuation of a signal (e.g., OTDR trace) with respect to distance (from the initiating OTDR pulse), which in this example is from the Columbus site. The attenuation graph 134 gives the user the ability to view the OTDR traces in situ, which greatly enhances the usability of tracing and the understanding of the fiber events in context. The OTDR trace information box 136 includes, among other things, a zoom-to-location button 138. When the zoom-to-location button 138 is selected, the program may change the GUI view 130 to an "anomaly map" or in-context fiber plant map 142 as shown in FIG. 8.

FIG. 8 is a screen shot showing an example of a GUI 140 for displaying the fiber plant map 142 when a zoom-to-location feature is selected, zooming into street-level view as far as possible based on KML data available. The fiber plant map 142 includes a narrower portion of the selected physical fiber plant link 98. Again, the icon 114 is used to pinpoint an estimated location of the anomaly on the physical fiber plant link 98. The fiber plant map 142 further shown geographic features in the vicinity of the physical fiber plant link. In the example shown in FIG. 8, the location of electrical power lines 144 are depicted in the fiber plant map 142. Also, natural gas pipelines 146, railway 148, and roadways 150 are shown. In addition to human-built features (e.g., electrical lines, pipes, roadways, etc.), the fiber plant map 142 may also include natural features, such as rivers 152, streams, lakes, etc. The GUI 140 may also be configured to display the OTDR trace information box 136 overlaid on top of a portion of the fiber plant map 142 and may be consistent with the box 136 shown in FIG. 7. Another further-zooming or anomaly-range feature may be selected to cause the program to produce an "anomaly range map" 162, as shown in FIG. 9

Figure 9:
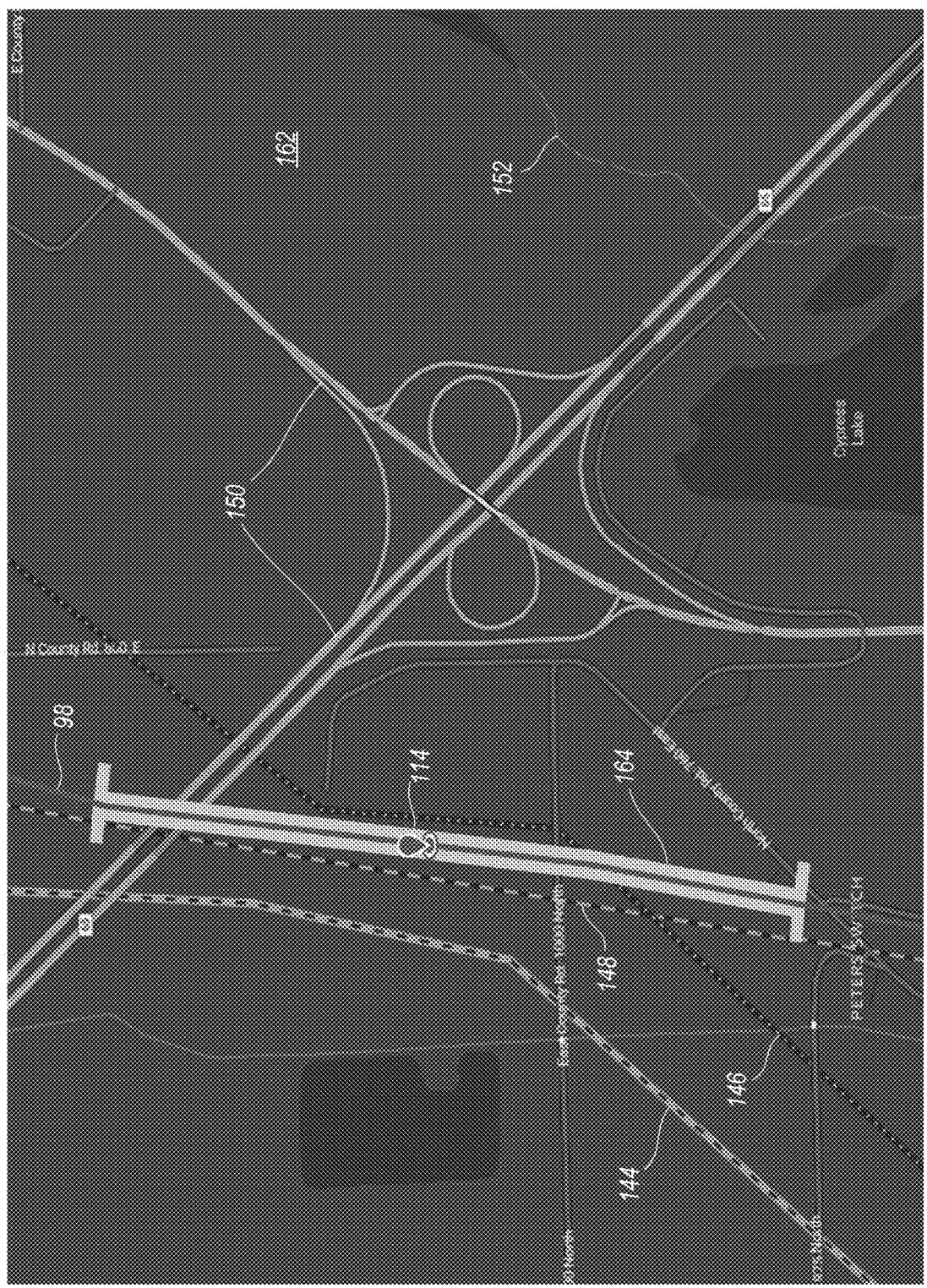
FIG. 9 is a screen shot of a GUI for displaying an anomaly range map, according to various embodiments.

FIG. 9 is a screen shot showing an example of a GUI 160 for displaying the anomaly range map 162 when the anomaly range is selected. The anomaly range map 162 shows a range of locations where the anomaly may actually exist based on a certain level of certainty. For example, the anomaly range map 162 may include an anomaly range bar 164 that extends from both sides of the approximate anomaly location that is indicated by the icon 114. The anomaly range bar 164 may be depicted to indicate that, within a certainty or confidence of about 95%, the program determines that the anomaly will be at or near the icon 114, plus or minus a certain length (e.g., about 100 meters). Thus, a confidence range of about 200 meters is shown by the anomaly range bar 164.

Therefore, the systems and methods of the present disclosure may include certain benefits with respect to conventional systems. By integrating KML data and OTDR traces into a management system of a network operator, via a network GIS/GPS map (or other launch points), the network operator may be able to optimize a troubleshooting workflow of a failed/down physical fiber plant link. The present disclosure also gives network operators visibility into their fiber cables with integrated OTDR capabilities and provides an in-context launch from a troubled link on the physical map to its geographical location on a network map, with OTDR traces available for viewing, and a drill-down (zoom-in) feature to allow more detailed viewing of the relative geographical location of the fiber fault event (e.g., cut, pinch) or anomaly. The embodiments of the present disclosure may increase the ease-of-use with respect to narrowing down a more precise localization of anomalies in an intuitive format with clear GUIs. This allows more precise fiber anomaly pinpointing.

It should be noted that some of the embodiments of the present disclosure may be incorporated in various applicable standards. For example, any of the following standards can be revised or added to: ITU-T Z-series recommendations, ANSI T1.232 OAM&P G Interface Specifications, and ITU-T G-series and ITU-T M-series recommendations.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A system comprising
a processing device, and
a memory device configured to store an anomaly localization module having logic instructions, which, when executed, cause the processing device to
display, on a Graphical User Interface (GUI), Network Elements (NEs) and physical fiber plant links of a fiber optic network on a generalized geographical map, the generalized geographical map displaying logical links, illustrated as substantially straight lines, between the NEs, and
responsive to a user selection, display, on the GUI, a physical fiber plant map illustrating a portion of the generalized geographical map that is based on obtained geographical coordinates of components associated with the fiber optic network, the physical fiber plant map replacing the logical links with physical links, the physical links being lines displayed that substantially reflect actual physical routing, between the NEs.

2. The system of claim 1, wherein the logic instructions, when executed, further cause the processing device to display a range of approximate locations where an anomaly is localized on a selected physical fiber plant link, wherein the anomaly is a physical event on the selected physical fiber plant link, and wherein the approximate locations of the anomaly is localized, and the approximate locations and the range are determined based on one or more optical tests.

3. The system of claim 2, wherein slack value is utilized to account for patch cord variance of each of the NEs and the range is based on at least one of a best, an expected and a worse case patch cord slack.

4. The system of claim 2, wherein the anomaly range is on an order of hundreds of meters.

5. The system of claim 2, wherein the one or more optical tests include Optical Time-Domain Reflectometry (OTDR) tests.

6. The system of claim 1, wherein the logic instructions, when executed, further cause the processing device to display an icon to indicate when Optical Time-Domain Reflectometry (OTDR) data is available.

7. The system of claim 6, wherein the logic instructions, when executed, further cause the processing device to display OTDR data or Standard OTDR Record (SOR) files in response to a selection of the icon.

8. The system of claim 6, wherein the logic instructions, when executed, further cause the processing device to display a first OTDR trace from a first NE to a second NE, and wherein, responsive to receiving a selection of a change-direction option, the processing device is further configured to display a second OTDR trace from the second NE to the first NE.

9. The system of claim 1, wherein the logic instructions, when executed, further cause the processing device to display a further zoomed in view showing representations of one or more of roadways, railway tracks, utility infrastructures, and waterways.

10. The system of claim 1, wherein physical routes and the geographical coordinates of components associated with the selected physical fiber plant link are recorded as Keyhole Markup Language (KML) data during installation of the fiber optic network.

11. The system of claim 1, wherein the user selection includes a selection of a physical fiber plant link, and wherein, responsive to the user selection, the processing device is configured to display, on the GUI, the physical fiber plant map showing a zoomed-in view of the selected physical fiber plant link.

12. A non-transitory computer-readable medium configured to store computer logic having instructions that, when executed, cause one or more processing devices to
- display, on a Graphical User Interface (GUI), Network Elements (NEs) and physical fiber plant links of a fiber optic network on a generalized geographical map, the generalised geographical map displaying logical links, illustrated as substantially straight lines, between the NEs, and
- responsive to a user selection, display, on the GUI, a physical fiber plant map illustrating a portion of the generalized geographical map that is based on obtained geographical coordinates of components associated with the fiber optic network, the physical fiber plant map replacing the logical links with physical links, the physical links being lines displayed that substantially reflect actual physical routing, between the NEs.

13. The non-transitory computer-readable medium of claim 12, wherein the instructions, when executed, further cause the one or more processing devices to display a range of approximate locations where an anomaly is localized on a selected physical fiber plant link, wherein the anomaly is a physical event on the selected physical fiber plant link, and wherein the approximate locations of the anomaly is localized, and the approximate locations and the range are determined based on one or more optical tests.

14. The non-transitory computer-readable medium of claim 13, wherein a slack value is utilized to account for patch cord variance of each of the NEs and the range is based on at least one of a best, an expected, and a worse case patch cord slack.

15. The non-transitory computer-readable medium of claim 13, wherein the anomaly range is on an order of hundreds of meters.

16. The non-transitory computer-readable medium of claim 13, wherein the one or more tests include Optical Time-Domain Reflectometry (OTDR) tests.

17. A system comprising
a processing device, and
a memory device configured to store an anomaly localization module having logic instructions, which, when executed, cause the processing device to
- display, on a Graphical User Interface (GUI), Network Elements (NEs) and physical fiber plant links of a fiber optic network on a generalized geographical map in response to Optical Time-Domain Reflectometry (OTDR) data being available for a link between two NEs, display an icon associated with the link on the generalized geographical map indicating availability of the OTDR data for the link, and
- responsive to a user selection, display, on the GUI, a physical fiber plant map based on obtained geographical coordinates of components associated with the fiber optic network.

18. The system of claim 17, wherein the logic instructions, when executed, further cause the processing device to display OTDR data or Standard OTDR Record (SOR) files in response to a selection of the icon.

19. The system of claim 17, wherein the logic instructions, when executed, further cause the processing device to display a first OTDR trace from a first NE to a second NE, and wherein, responsive to receiving a selection of a change-direction option, the processing device is further configured to display a second OTDR trace from the second NE to the first NE.

20. The system of claim 17, wherein the logic instructions, when executed, further cause the processing device to display a range of approximate locations where an anomaly is localized on a selected physical fiber plant link, wherein the anomaly is a physical event on the selected physical fiber plant link, and wherein the approximate locations of the anomaly is localized, and the approximate locations and the range are determined based on one or more optical tests.

* * * * *